E. R. HYDE & T. D. ADAMS.
GRINDING MACHINE.
APPLICATION FILED JUNE 23, 1914.

1,133,476.

Patented Mar. 30, 1915.
5 SHEETS—SHEET 1.

WITNESSES:
E. M. Culver
H. W. Meade

INVENTORS
Elwin R. Hyde and
Thomas D. Adams
BY
A. W. Wooster
ATTORNEY

E. R. HYDE & T. D. ADAMS.
GRINDING MACHINE.
APPLICATION FILED JUNE 23, 1914.

1,133,476.

Patented Mar. 30, 1915.
5 SHEETS—SHEET 3.

WITNESSES:
H W Meade
E. M. Culver

INVENTORS
Elwin R. Hyde and
Thomas D. Adams
BY
A. M. Wooster
ATTORNEY

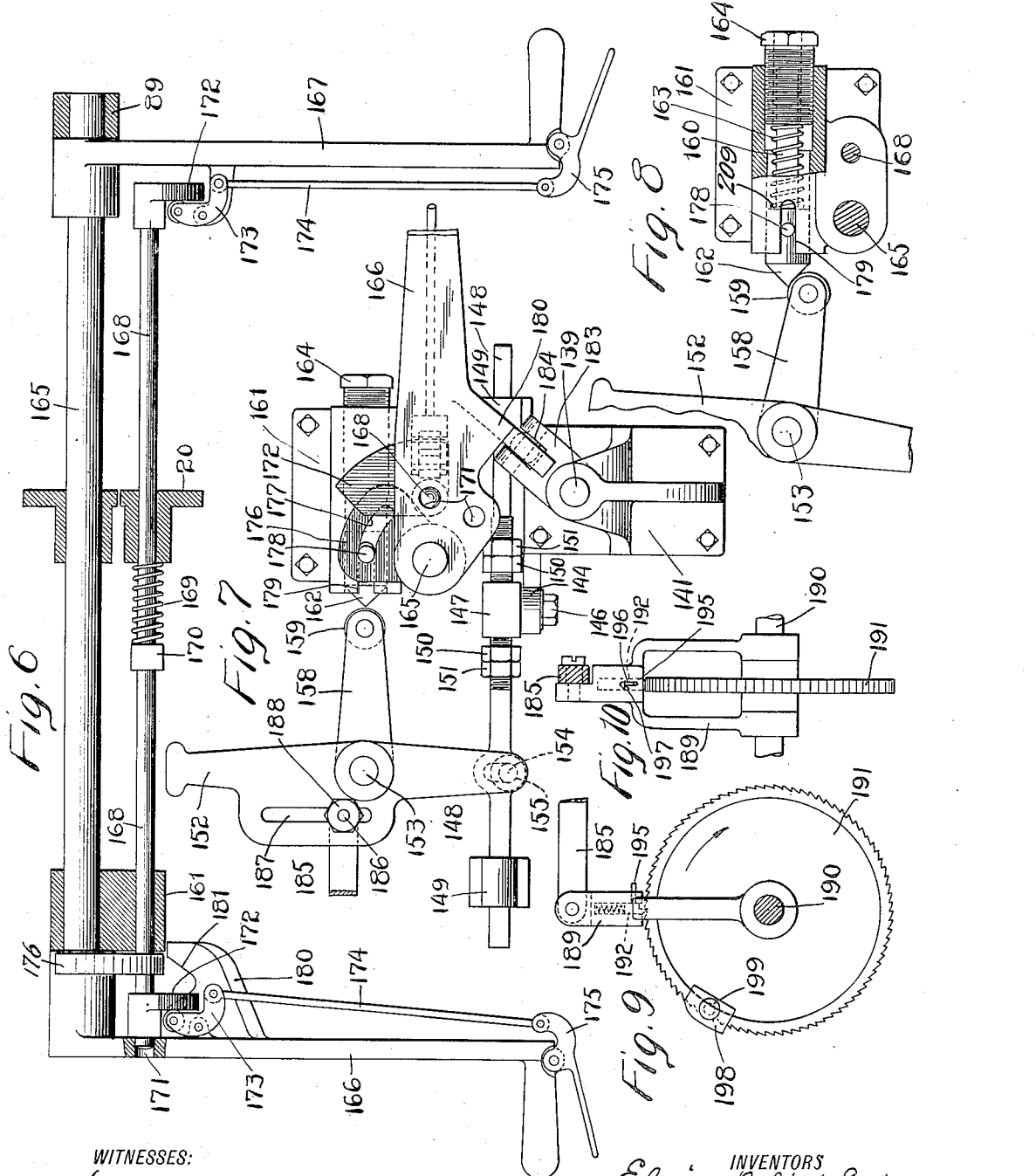

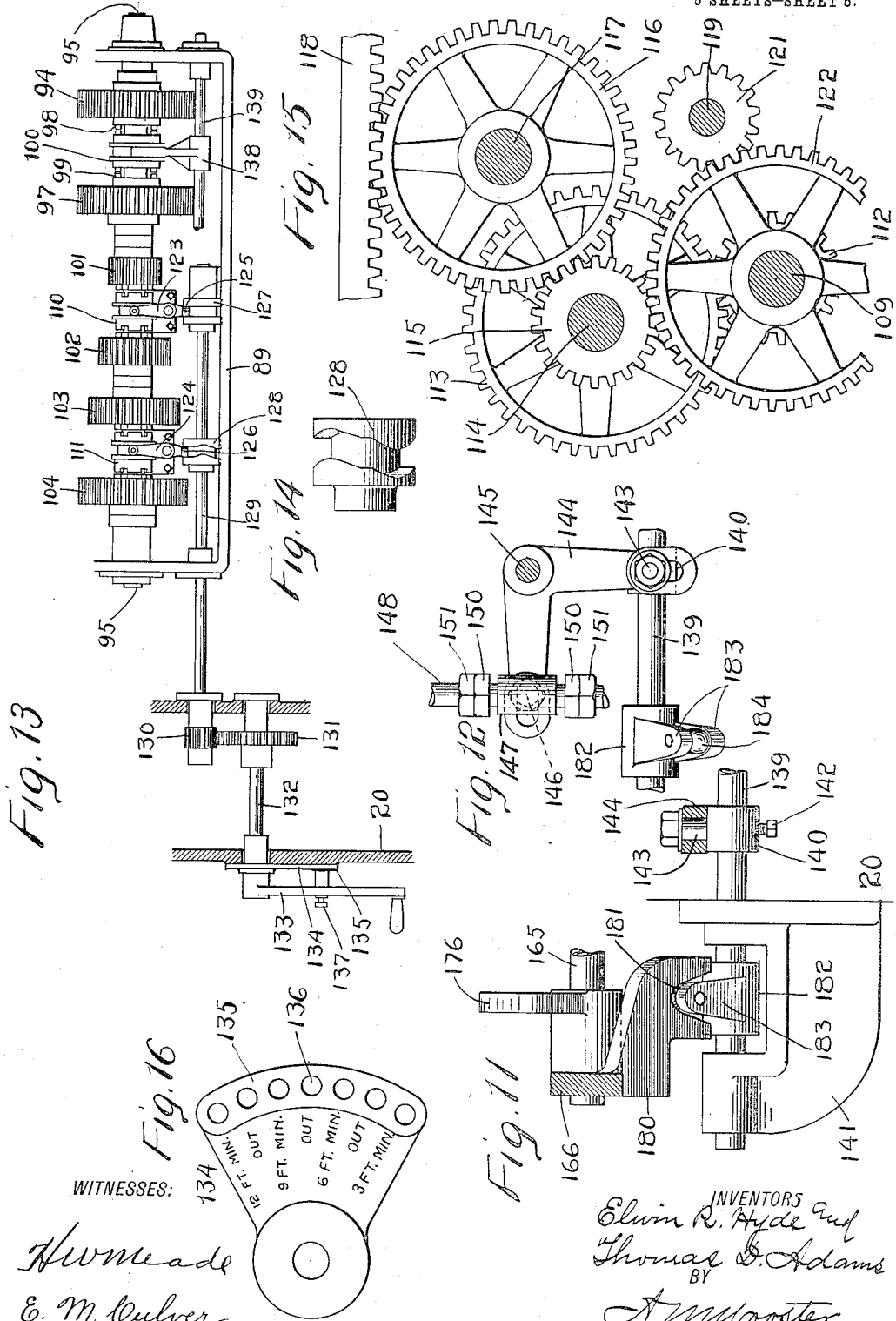

UNITED STATES PATENT OFFICE.

ELWIN R. HYDE, OF BRIDGEPORT, AND THOMAS D. ADAMS, OF WESTPORT, CONNECTICUT; SAID ADAMS ASSIGNOR TO SAID HYDE.

GRINDING-MACHINE.

1,133,476.  Specification of Letters Patent.  Patented Mar. 30, 1915.

Application filed June 23, 1914. Serial No. 846,779.

*To all whom it may concern:*

Be it known that we, (1) ELWIN R. HYDE and (2) THOMAS D. ADAMS, citizens of the United States, residing at (1) Bridgeport and (2) Westport, county of Fairfield, State of Connecticut, have invented an Improvement in Grinding-Machines, of which the following is a specification.

This invention relates to grinding machines and has reference more particularly to machines of the general type comprising a reciprocating carriage for presenting or feeding the work to a grinding wheel which engages the lateral face of the work as it is moved thereby on said carriage, means being usually provided whereby said grinding wheel may be moved or fed toward the work as the grinding operation progresses.

The invention has for its objects to improve the general construction, arrangement and operation of machines of the above and other types, to facilitate the control thereof, and to provide for a wide range of adaptability of the machine to work of various kinds imposing different requirements as to adjustment and operation.

Figure 1:
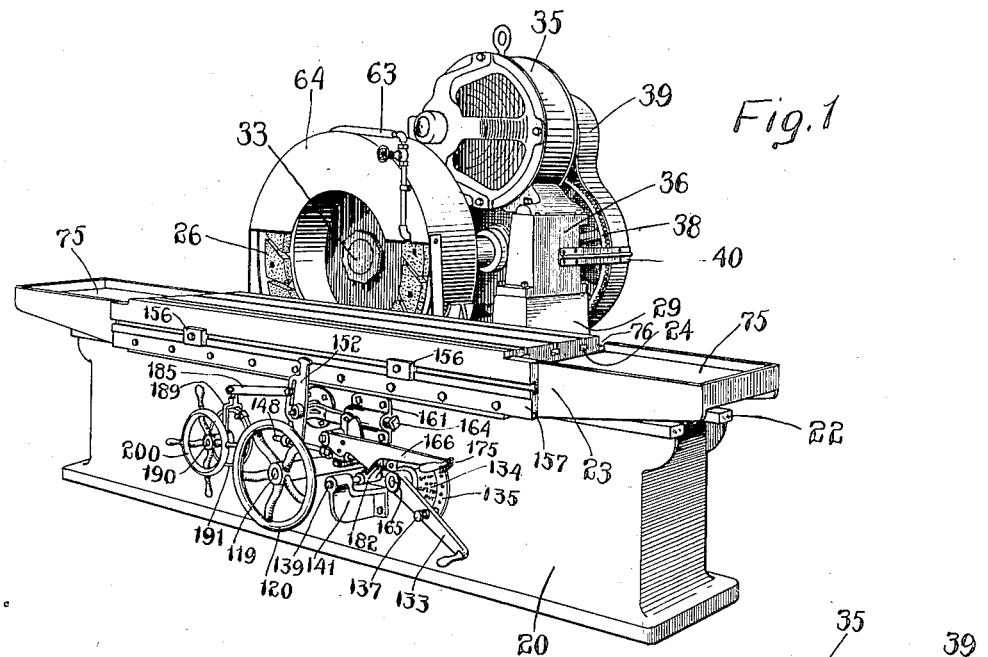
Figure 2:
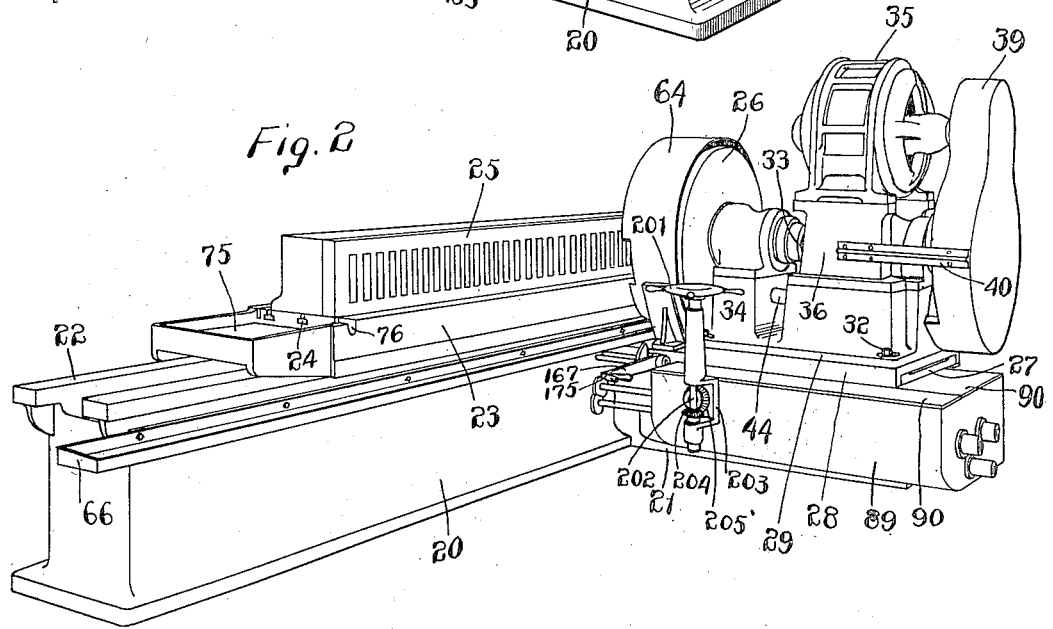
Figure 3:
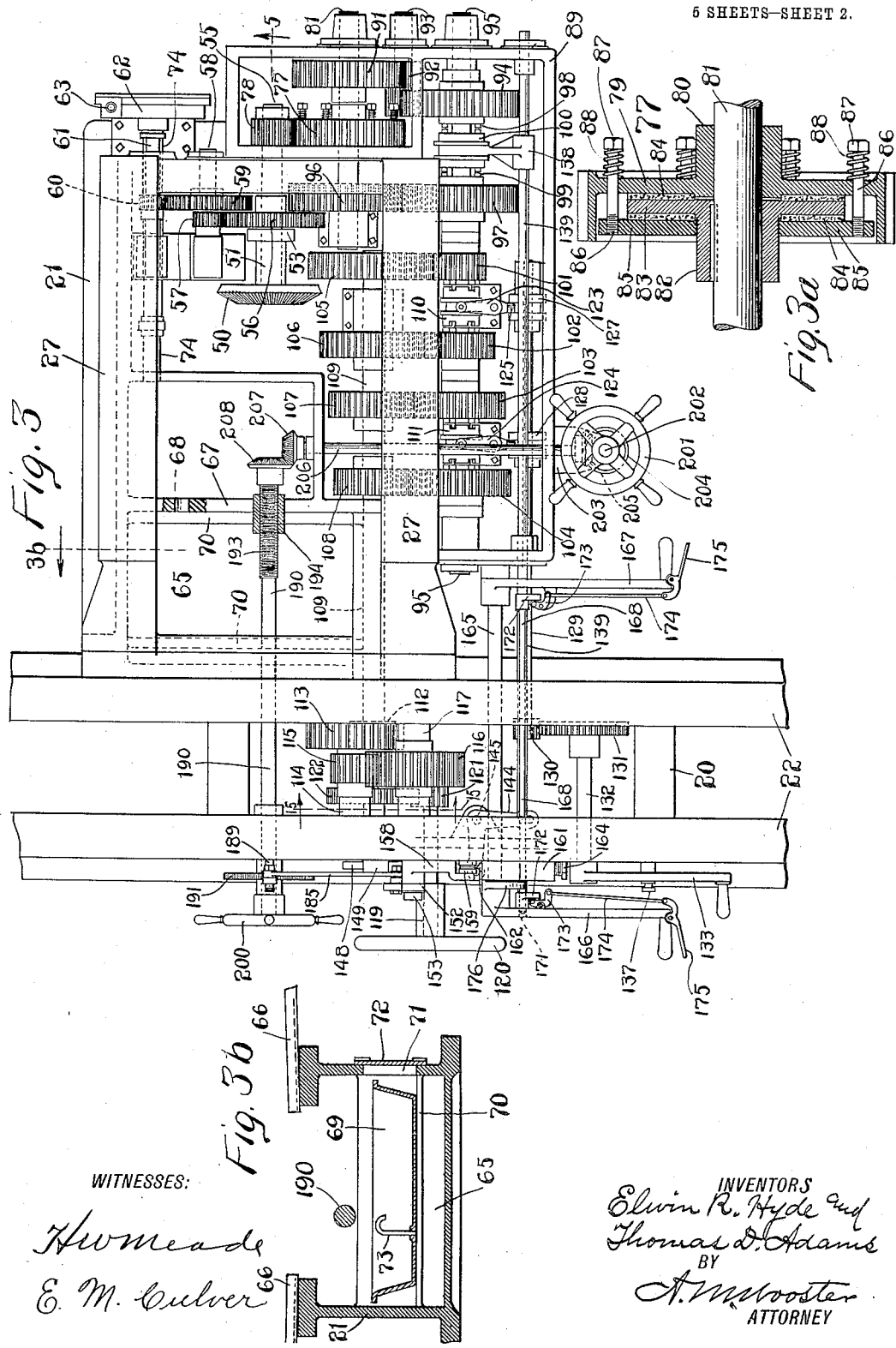
Figure 4:
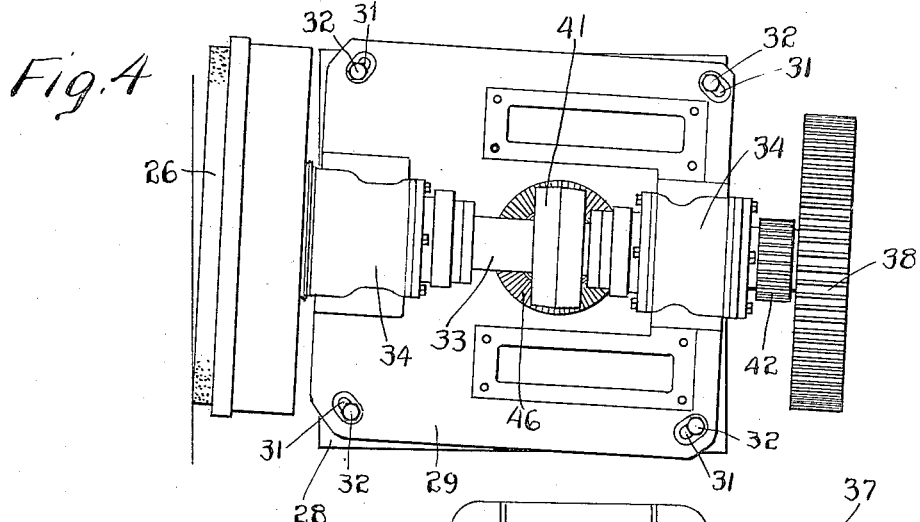
Figure 5:
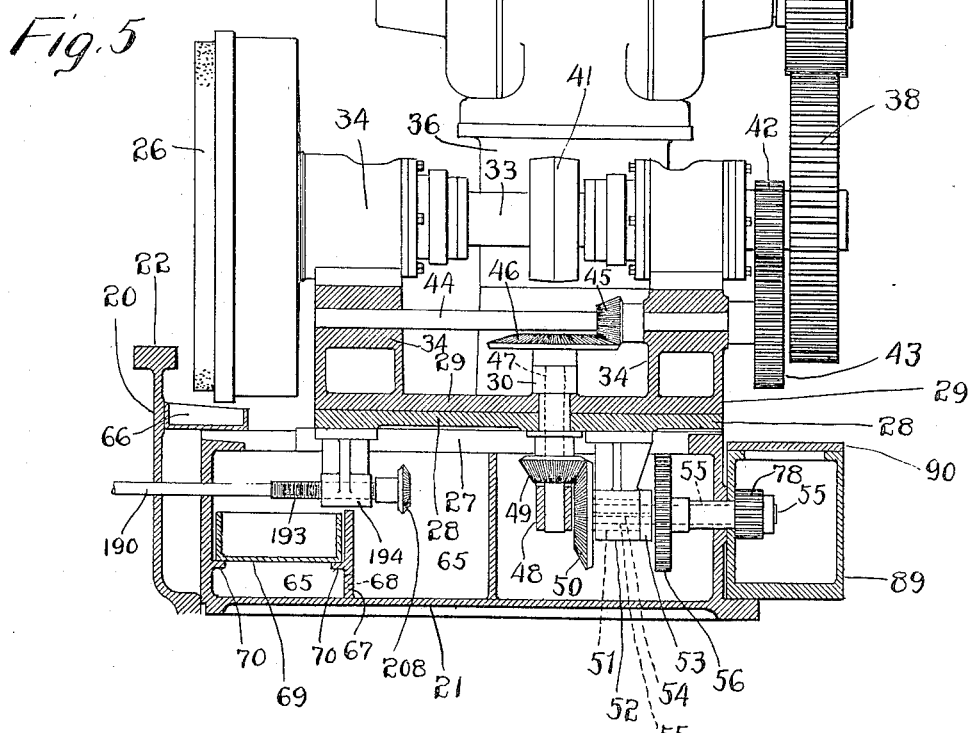

With these and other objects in view we have devised the novel machine which will now be described, reference being had to the accompanying drawings, in which:

Figure 1 is a perspective view looking from the front of the machine; Fig. 2 is a similar view looking from the rear and illustrating a machine having a longer bed and a work carriage equipped with a magnetic chuck or work holder; Fig. 3 is a plan view with the work carriage, the motor or grinder carriage, the drip pans or gutters, and the mud pan or trap omitted; Fig. 3ᵃ is a detail section view on an enlarged scale of the frictionally mounted gear forming a part of the train of mechanism connecting the motor or other source of power with the mechanism for operating the carriages; Fig. 3ᵇ is a section on the line 3ᵇ, Fig. 3, showing the mud or settling pan; Fig. 4 is a plan view of the motor or grinder carriage with the motor and its supporting brackets omitted and showing the grinding wheel adjusted for concave grinding; Fig. 5 is a vertical section of the motor or grinder carriage and adjacent parts taken substantially on the line 5, Fig. 3; Fig. 6 is a detail horizontal section showing the manually operated means for controlling the movement of the work carriage; Fig. 7 is a fragmentary elevation of a part of the mechanism for controlling the reciprocation of the work carriage; Fig. 8 is a fragmentary elevation, partly in section, of certain parts shown in Fig. 7 illustrating these parts in a different position; Figs. 9 and 10 are front and side elevations, respectively, of the ratchet mechanism for controlling the feed of the motor or grinder carriage; Fig. 11 is an end view, partly in section, of certain of the parts shown in Fig. 7 looking from the right in the latter figure; Fig. 12 is a detail plan view of portions of the shipper rod, the reversing clutch controlling rod, and the parts connecting said rods; Fig. 13 is an elevation, partly broken away, of the transmission controlling mechanism; Fig. 14 is a detail elevation of one of the transmission controlling cams; Fig. 15 is a detail section on the line 15—15, Fig. 3, and Fig. 16 is a detail elevation of the index plate and locking segment for the transmission controlling lever.

The frame of the machine preferably comprises a bed 20 and an integral or rigidly connected back extension 21 projecting rearwardly from said bed at approximately the center thereof, said frame providing the necessary supports, guides and bearings for the various parts of the mechanism except as hereinafter pointed out.

22 denotes guides on the bed 20 and upon which is slidably mounted, for reciprocation longitudinally of the bed, a work carriage 23. The carriage 23 is provided with suitable work attaching means, as, for example, with undercut grooves 24 for the reception of suitable dogs or clamps. Preferably, however, and as shown in Fig. 2, said work attaching means comprises a suitably formed magnetic chuck 25 secured in proper position upon the carriage 23 by means of bolts or the like (not shown) which engage the grooves 24, said chuck having a rear work holding face adapted to support the work in a suitable position to be engaged by the grinding wheel 26 as the carriage 23 is reciprocated.

27 denotes guides mounted on the back extension 21 and extending in a direction transverse to the guides 22 and bed 20.

28 denotes the motor or grinder carriage which is slidably mounted on the guides 27 for movement longitudinally thereof.

29 denotes the motor or grinder turret which is pivoted to the grinder carriage 28 by means of a hollow bushing 30. Turning movement of the turret 29 with respect to the carriage 28 on the pivot afforded by the bushing 30 is limited by short segmental slots 31 in the turret 29 through which pass screws 32 in threaded engagement with the carriage 28 and by means of which the turret 29 may be clamped in adjusted angular position with respect to the carriage 28.

33 denotes the grinder shaft which is journaled in uprights 34 on the turret 29 and to the end of which is secured the grinding wheel 26. Said grinding wheel may be of any suitable material or construction. In Figs. 4 and 5 is shown a single integral wheel, while in Fig. 1 is illustrated a wheel composed of a plurality of blocks or sections bolted or otherwise secured to a suitable base or web. By so adjusting the turret 29 with respect to the carriage 28 that the axis of the shaft 33 is perpendicular to the direction of reciprocation of the work carriage 23, it will be seen that the work will be engaged by both sides of the outer face of the grinding wheel 26, this being the adjustment for flat grinding. By slightly adjusting the turret 29 into such a position that the axis of the shaft 33 forms an acute angle with the direction of movement of the carriage 23, as shown in Fig. 4, it will be seen that the grinding wheel 26 will engage the work at one of its curved edges only. This is the adjustment for concave grinding, the amount of concavity being determined by the curvature of the wheel 26 employed and the angular adjustment of the turret 29 on the carriage 28.

35 denotes an electric motor which is supported, in a position above the shaft 33, upon brackets 36 bolted to the turret 29.

37 denotes a gear on the motor shaft which meshes with a gear 38 on the grinder shaft 33, and by means of which said grinder shaft and grinding wheel 26 are rotated. The gears 37 and 38 are preferably inclosed in a suitable gear casing 39 (see Figs. 1 and 2) supported from the motor brackets 36 by means of arms or brackets 40. By means of the mounting of the motor 35 on the turret 29, and the gears 37 and 38 connecting said motor with the shaft 33, it will be seen that there is provided a positive driving connection for the grinding wheel 26 which is not in any manner disturbed by the angular adjustment of the turret 29 on the carriage 28.

41 denotes a pulley mounted on the shaft 33 and by means of which the grinding wheel 26 may, if desired, or found more convenient, be driven through a belt (not shown) from any suitable source of power. When the machine is to be thus belt-driven the motor 35 may be removed by unbolting the brackets 36 from the turret 29, as shown in Fig. 4, or may be omitted altogether. Also, as will be understood, the pulley 41 may, if desired, be omitted if the machine is to be driven by the motor alone. The power supplied to the shaft 33 from the motor 35 through the gears 37 and 38, or from any other source through the pulley 41, is transmitted from said shaft to the other portions of the machine for the purpose of actuating the latter by mechanism which will now be described.

42 denotes a second gear on the shaft 33 which meshes with a gear 43 on a countershaft 44 journaled in the uprights 34.

45 denotes a bevel gear fast upon the shaft 44 and meshing with a bevel gear 46 secured to a transmission shaft 47 journaled in the bushing 30 and in a bracket 48 secured to and depending from the carriage 28.

49 denotes a second bevel gear fast upon the shaft 47 beneath the bushing 30, said bevel gear 49 meshing with a bevel gear 50 (see also Fig. 3) provided with a preferably integral hub or sleeve portion 51 which is journaled in a hanger or bracket 52 secured to and depending from the carriage 28. The hub or sleeve 51 is formed with a collar or flange 53 which engages the hanger 52 at the side opposite the bevel gear 50. Said hub or sleeve 51 is further connected, by means of an elongated spline or feather 54, with a shaft 55 journaled in the back extension 21 of the framework. By means of its connection with the shaft 51 the gear 50 is caused to rotate with said shaft, but is movable longitudinally thereon. By reason of its connection with the hanger 52 said gear 50 is permitted to rotate in said hanger with the shaft 55, but is moved longitudinally on said shaft with the carriage 28, and thereby held at all times in mesh with the gear 49. By reason of the mounting of the gears 46 and 49 on the shaft 47, which is journaled in the bushing 30 constituting the pivot connecting the carriage 28 and turret 29, it will be seen that said shaft and gears are co-axial with said pivot, so that a positive driving connection, which is in no way disturbed by the angular adjustment of the turret 29, is at all times maintained between the source of power on the turret and the shaft 55.

56 denotes a gear fast on the shaft 55 and which meshes with a gear 57 (see Fig. 3) on a shaft 58 suitably journaled in the framework.

59 denotes a second gear on the shaft 58 which meshes with a gear 60 on the shaft 61 of a rotary pump 62, said pump being suitably supported and said shaft being suitably journaled in the machine frame.

63 denotes the discharge pipe of the pump 62 which discharge pipe (see Fig. 1) terminates in a suitable nozzle adapted to direct a stream of water upon the face of the grinding wheel 26.

64 denotes a hood inclosing the grinding wheel 26 and adapted to confine the surplus water centrifugally discharged therefrom, and to direct the same into a tank or reservoir 65, preferably formed integral with the back extension 21 of the frame work, or into drip pans or gutters 66 which are supported by the bed 20 and extend longitudinally thereof or parallel to the direction of movement of the carriage 23, and which discharge into said tank or reservoir 65. As shown the tank 65 is divided by a wall 67 which is provided with one or more openings 68 providing free circulation of water between the two parts of the tank, said wall performing no function as a partition but serving merely as a strengthening and supporting member.

The water discharged from the hood 64 and drip pans 66 is received initially in a mud or settling pan or trap 69 (see Fig. 3b) slidably mounted on flanges or ways 70 in one end of the tank 65, said flanges being formed on the end wall of said tank and on the partition 67, respectively. The settling pan 69 is removable from the tank 65, for purposes of emptying or cleaning, through an opening 71 in the wall of said tank, said opening being normally closed by means of a suitable door 72. The water received in the pan 69, after remaining therein a sufficient time to allow the sediment produced in the grinding operation to settle, is drawn or siphoned from said pan by means of a discharge pipe 73 having a curved upper end and discharging at its lower end into the body of the tank 65.

74 denotes the inlet or supply pipe of the pump 62 which pipe communicates with the reservoir or tank 65.

From the foregoing it will be seen that the water drawn from the tank 65 by the pump 62 is discharged upon the grinding wheel 26 and subsequently returned to the tank 65 for reuse, said water being, at each operation, purified or relieved of its sediment which is caught in the settling pan or trap 59.

75 denotes chambers or receptacles formed at the ends of the work carriage 23 into which the water received upon the upper surface of said carriage is permitted to collect and from which said water is discharged through notches 76 into the drip pans or gutters 66.

78 (see Figs. 3 and 5) denotes a second gear fast on the shaft 55 and meshing with a gear 77. The gear 77 comprises a toothed periphery connected by a web 79 (see Fig. 3a) with a hub or sleeve portion 80 loosely mounted on a shaft 81. 82 denotes a sleeve keyed to the shaft 81 and formed with a radially extending annular flange 83. 85 denotes a friction ring or annulus rotatably mounted on the sleeve 82 at the side of the flange 83 opposite the web 79. 84 denotes washers or disks of leather or other suitable friction material interposed between the flange 83 and the web 79 and annulus 85. The ring or annulus 85 is connected with the web 79 by means of bolts 86 in threaded engagement with said ring or annulus and passing loosely through suitably disposed openings in said web, whereby said web and annulus are connected for rotation in unison. 88 denotes springs interposed between heads 87 on the bolts 86 and the web 79. Said springs 88 act to draw the annulus 85 and web 79 toward one another, thereby tightly clamping the flange 83 and friction disks 84 between said annulus and web. By this construction the gear 77 is frictionally connected with the shaft 81 for normal rotation therewith but is permitted to slip or yield with respect to said shaft, thereby serving to cushion such shocks upon the transmission connections as may be incidental to the sudden reversal of movement of the work carriage, as hereinafter explained, or to other causes.

The shaft 81 is journaled in the machine frame and in a gear box or casing 89 suitably secured to the back extension 21 of the frame, said casing inclosing the gears 77 and 78 and other gears hereinafter referred to, and being provided with a suitably formed cover or covers 90 (see Fig. 2) detachably secured thereto by any suitable means (not shown).

91 denotes a gear fast on the shaft 81 which meshes with a gear 92 journaled on a stud shaft 93 mounted in the wall of the gear casing, said gear 92 meshing also with a gear 94 loosely mounted on the transmission countershaft 95 which is journaled in the gear casing 89.

96 denotes a second gear fast on the shaft 81 and meshing with a gear 97 also loose on the shaft 95. The gears 94 and 97 are provided with hubs formed with clutch faces 98 and 99 respectively, said clutch faces coöperating with the clutch faces of a double faced clutch hub 100 splined to the shaft 95 for rotation therewith but movable longitudinally theron.

It will be understood that the shaft 81 is rotated continuously in one direction through its connections heretofore described with the motor 35 or other source of power on the grinder turret 29. This rotation of the shaft may be communicated to the shaft 95 through the gears 96 and 97 to rotate the shaft 95 in one direction, or through the gears 91, 92 and 94 to rotate said shaft in the opposite direction, by clutching either of the gears 97 or 94 to said shaft 95 by means of the clutch hub 100. As shown in Figs. 3 and 13 the clutch hub 100 is in its central or neutral position, being out of clutching engagement with both of the clutch faces 98 and 99. By moving said clutch hub to the left from the position shown it will be brought into operative engagement with the clutch face 99, thereby clutching the gear 97 to the shaft 95 and causing said shaft to be rotated in one direction. Similarly by moving said clutch hub toward the right from the position shown the gear 94 will be clutched to the shaft 95 and said shaft rotated in the opposite direction.

101, 102, 103 and 104 denote a series of gears of progressively increasing size from right to left (as shown in Figs. 3 and 13) loosely mounted on the transmission countershaft 95. For convenience four of such gears are shown, although it will be obvious that any other suitable number might be employed in accordance with the requirements.

105, 106, 107 and 108 denote a second series of gears of progressively decreasing size from right to left (as shown in Fig. 3) and meshing respectively with the gears 101, 102, 103 and 104. The gears 105, 106, 107 and 108 are fast upon the back gear shaft 109 which is suitably journaled in the framework.

110 and 111 denote double faced clutch hubs splined upon the shaft 95 for rotation therewith. The clutch hub 110 is interposed between the gears 101 and 102, and the clutch hub 111 is similarly interposed between the gears 103 and 104. The clutch hub 110 is movable, by means hereinafter described, longitudinally upon the shaft 95 from the neutral position shown in Figs. 3 and 13 into positions to clutch either the gear 101 or the gear 102 to said shaft. The clutch hub 111 is similarly movable to clutch either the gear 103 or the gear 104 to the shaft 95. When any of said gears is connected to the shaft 95 so as to rotate therewith it will be seen that the shaft 109 will be rotated from the shaft 95 at a speed relative to the speed of rotation of the shaft 95 depending upon which of the gears 101 to 104, inclusive, is connected with said shaft 95. It will therefore be seen that the speed of rotation of the back gear shaft 109 is controlled by the clutch hubs 110 and 111 and that the direction of rotation of the transmission countershaft 95 and consequently of the back gear shaft 109 is controlled by the clutch hub 100.

112 (see Figs. 3 and 15) denotes a pinion fast upon the forward end of the back gear shaft 109. The pinion 112 meshes with a gear 113 secured to a shaft 114 suitably journaled in the frame work.

115 denotes a pinion fast on the shaft 114, and meshing with a gear or pinion 116 on a shaft 117 suitably mounted in the framework. The pinion 116 meshes with a rack 118 secured to or formed upon the under side of the work carriage 23. The work carriage 23 may therefore be moved on its guides 22 by power transmitted from the source on the grinder turret 29 through the connections heretofore described, the direction and speed of such movement depending upon the position of the clutch hubs 100, 110 and 111 as above explained.

With the clutch hubs in the neutral positions shown in Figs. 3 and 13 it will be seen that the carriage operating mechanism is disconnected from its source of power. When so disconnected the work carriage may be manually moved by the following mechanism. 119 denotes a shaft suitably journaled in the frame work, and provided at the front of the machine with a hand wheel 120 (see also Fig. 1). 121 denotes a pinion fast on the shaft 119 and meshing with a gear 122 fast upon the back gear shaft 109. By turning the hand wheel 120 the shaft 109 will be turned through the pinion 121 and gear 122, thereby, through the train of gearing above described, moving the work carriage 23.

For controlling the clutch hubs 110 and 111, and thereby adjusting the speed of reciprocation of the work carriage, the following mechanism is provided, reference being had to Figs. 3 and 13. 123 and 124 denote clutch forks suitably pivoted to the gear casing 89 and provided with arms carrying pins or rollers engaging suitable grooves in the clutch hubs 110 and 111 respectively. Beyond their pivots the clutch forks 123 and 124 are provided with arms carrying rollers 125 and 126 which engage suitably formed grooves in cams 127 and 128 (see also Fig. 14) carried by a shaft 129 journaled in the gear casing 89 and in the bed 20. The form of the grooves in the cams 127 and 128 is such that, as the shaft 129 is progressively rotated in one direction, during the first part of the movement the clutch hub 111 will be operated and the clutch hub 110 held in neutral position, and during the latter part of the movement the clutch hub 110 will be operated and the clutch hub 111 held in neutral position. During the first part of said movement the clutch hub 111 is first moved from neutral position into engagement with the gear 104, then returned to neutral position, then moved into engagement with the gear 103, and thereafter returned again to neutral position. During the latter part of said movement the clutch hub 110 is first moved into engagement with the gear 102, then into neutral position, then into engagement with the gear 101, and finally returned to neutral position, thereby completing the cycle of operations. It will therefore be seen that during one rotation of the shaft 129 all of the alternative transmission connections between the shafts 95 and 109 are rendered successively operative to produce all of the possible speeds of drive of the work carriage.

For adjusting the shaft 129 to produce any desired speed of drive the following mechanism is provided. 130 denotes a gear fast on the shaft 129 which meshes with a gear 131 on a shaft 132 journaled in the bed 20 and provided at the front of the machine with a hand lever or crank 133 (see also Fig. 1). 134 (see also Fig. 16) denotes an index plate secured to the front of the bed 20 and provided with a locking segment 135 having a series of holes or recesses 136 each adapted to receive the end of a spring pressed locking plunger or bolt 137 carried by the hand lever 133. The arrangement of the holes or recesses 136 is such that the hand lever 133 may be locked in position to cause the connection of any of the gears 101, 102, 103 and 104 to the shaft 95 or to cause the clutch hubs 110 and 111 to be held in neutral position, all of these positions being preferably indicated on the index plate 134.

The mechanism for operating and controlling the clutch hub 100 and for consequently determining the direction of rotation of the shafts 95 and 109 and the direction of travel of the work carriage is as follows. 138 (see Figs. 3 and 13) denotes a clutch fork or shifter coöperating with the clutch hub 100 and carried by a rod 139 guided for longitudinal movement in the gear casing 89, the bed 20, and a bracket 141 (see Figs. 7 and 11) secured to the front of said bed. 140 denotes a collar secured, as by a set screw 142, to the rod 139 and carrying a pin or bolt 143 which engages one slotted arm of a bell crank lever 144 (see also Fig. 12) pivoted at 145 to the framework. The opposite arm of the bell crank lever 144 is likewise slotted to receive a pin or bolt 146 carried by a collar or sleeve 147 loosely mounted on a shipper rod 148 guided for longitudinal movement in suitable guides 149 secured to the front of the bed. 150 denotes stop nuts carried by a threaded portion of the shipper rod 148 on opposite sides of the sleeve 147 and held in adjusted position by lock nuts 151. The stop nuts 150 provide for a limited and adjustable amount of lost motion between the shipper rod 148 and the sleeve 147 and bell crank lever 144 for a purpose presently to be explained. 152 (see Figs. 1, 3, 7 and 8) denotes a shipper lever which is pivoted at 153 to the front of the bed and which is connected with the shipper rod 148 by means of a pin 154 (Fig. 7) carried by said lever which engages a slot 155 in said shipper rod. 156 (Fig. 1) denotes dogs or stops bolted or otherwise adjustably secured to a depending flange 157 of the work carriage 23 and adapted, as said carriage is moved in opposite directions, respectively to engage the shipper lever 152. 158 denotes an arm integral with or rigidly attached to the shipper lever 152 and carrying at its end a roller 159 having a V-shaped groove (see Fig. 3). 160 (see particularly Fig. 8) denotes a plunger slidably mounted in a bracket 161 bolted or otherwise secured to the front of the bed 20, said plunger having a conical end constituting an arrow head 162 which engages the roller 159, the point of said arrow head substantially fitting the V-shaped groove in said roller. 163 denotes a spring surrounding the plunger 160 and interposed between a shoulder 209 formed thereon and an adjustable abutment screw 164 in threaded engagement with the bracket 161. The action of the spring 163 is to force the plunger 160 toward the left (as shown in Figs. 7 and 8) and, by engagement of the conical arrow head 162 with the roller 159, to hold the shipper lever 152, shipper rod 148, and clutch controlling rod 139 in one extreme position or the other.

It will be understood that with the parts in the position shown in Fig. 8 the clutch hub 100 is in a position to cause movement of the work carriage toward the left as viewed in Fig. 1. When the carriage has been so moved a suitable distance the dog or stop 156 at the right end thereof engages the upper end of the shipper lever 152, thereby moving said lever into or slightly beyond the position of dead center shown in Fig. 7, the plunger 160 being pushed toward the right against the tension of the spring 163. This movement of the shipper lever, communicated through the shipper rod 148 and clutch controlling rod 139 to the clutch hub 100, causes said clutch hub to be moved into the neutral position shown in Figs. 3 and 13. By reason of the lost motion permitted by the stop nuts 150 and sleeve 147 the shipper lever 152 may be moved slightly beyond the position of dead center before the clutch hub 100 is completely moved into neutral position. Thereafter the force of the spring 163, communicated to the shipper lever 152 through the arrow head 162 and roller 159, causes said shipper lever 152 to be moved into the extreme position opposite to that shown in Fig. 8, causing the clutch hub 100 to be moved into a position to cause the carriage 23 to be moved to the right. This movement is continued until the stop or dog 156 adjacent the left end of the carriage is brought into engagement with the shipper lever 152, whereupon said lever is again shifted, or returned to the position shown in Fig. 8, and the direction of movement of the carriage again reversed.

From the foregoing it will be seen that the carriage 23 will be automatically reciprocated through a distance determined by the setting of the stop dogs 156 and at a speed determined by the adjustment of the lever 133. In order to provide a manual control of the carriage and to enable the operator to stop the same at any point in its travel should circumstances so require, and, if necessary, to reverse its movement before the completion of its travel in one direction determined by the position of the corresponding dog 156, the following means are provided. 165 (see Figs. 3, 6 and 7) denotes a shaft journaled in the bed 20 and in the gear casing 89. 166 and 167 denote hand levers secured to the shaft 165 in front of and behind the bed 20, respectively. By the provision of two hand levers on the opposite sides of the bed the operator is enabled conveniently and quickly to stop the movement of the carriage at any time irrespective of his position in front of or back of the machine. 168 denotes a locking rod or bolt slidably mounted on the bed 20 and normally held in the position shown in Fig. 6 by means of a spring 169 interposed between a collar 170 on said rod and the framework. The end of the rod or bolt 168 is adapted to engage one of two apertures or recesses 171 in the lever 166 for the purpose of locking said lever, and consequently the shaft 165, lever 167, and other connected parts, in operative or inoperative position. 172 denotes wings or segmental flanges suitably secured to the rod 168 and which are engaged by rollers carried by bell crank levers 173 pivoted to the hand levers 166 and 167, respectively, and connected by rods 174 with latch levers 175 pivoted to the hand levers 166 and 167 in convenient positions adjacent the handles thereof. As will be seen, by operating either of the latch levers 175, the rod or bolt 168 may be withdrawn against the tension of the spring 169 from the openings 171, thereby permitting the shifting of said hand levers and of the mechanism controlled thereby.

176 (see Figs. 6, 7 and 11) denotes a segmental arm formed on the hub of the lever 166, and having a slot 177 which receives a pin 178 projecting from the plunger 160 through a slot 179 (see Fig. 8) in the wall of the guide bracket 161. When the lever 166 is depressed into the operative position shown in Fig. 7, the engagement of the end of the slot 177 with the pin 178 causes the arrow head 162 to be withdrawn from the roller 159, thereby permitting the shipper lever 152 to be freely moved in either direction for a purpose presently to be explained.

180 denotes a cam arm projecting downwardly from the lever 166, and provided at its lower end with a substantially V-shaped cam notch 181 (Fig. 11).

182 (see also Fig. 12) denotes a collar secured to the clutch-controlling rod 139 and provided with a pair of projecting arms 183 carrying between them a preferably spherical roller 184 (Figs. 7, 11 and 12).

The construction of the parts last described is such that when the lever 166 is depressed into the position shown in Fig. 7, either by direct operation or by operation of the lever 167, engagement of the roller 184 by the notch 181 in the arm 180 will, by cam action, draw the clutch controlling rod 139 from either extreme position into the intermediate position shown in Fig. 11, at which time the clutch hub 100 is in the neutral position shown in Figs. 3 and 13, so that the movement of the carriage is immediately stopped. Thereupon the shipper lever 152 may, if desired, be shifted manually a sufficient distance to bring the roller 159 into a position at the opposite side of the dead center (sufficient movement to accomplish this being permitted by the lost motion provided between the sleeve 147 and stop nuts 150) so that, when the lever 166 is returned to its normal or upper position, the clutch controlling rod 139 released by the cam arm 180, and the plunger 160 released by the slotted arm 176, the arrow head 162, under the influence of the spring 163, will cause the shipper lever 152 to be completely shifted, thereby causing the carriage to commence its travel in a direction opposite to that in which it was moving when stopped.

As the grinding operation progresses it is necessary that the grinding wheel 26 be moved progressively in the direction of the work. This is accomplished by moving the grinder carriage 28 on the guides 27, and in accordance with the present invention means are provided whereby this feeding of the grinder carriage may be accomplished either automatically or manually. The automatic feeding means are as follows. 185 (see Figs. 1, 3, 7, 9 and 10) denotes a link adjustably connected, at one end, to the shipper lever 152 by means of a bolt 186 which passes through a slot 187 in said shipper lever and which may be clamped in any desired position therein by means of a suitable nut or nuts 188. By adjusting the position of the bolt 186 in the slot 187 the movement imparted to the link 185 at each oscillation of the shipper lever 152, incidental to the reversal of the travel of the work carriage, may be varied. Pivoted to the link 185, at its end opposite the shipper lever 152, is a yoke or pawl carrier 189 having the lower ends of its arms fulcrumed upon a shaft 190 journaled in the bed 20. 191 denotes a ratchet wheel fast upon the shaft 190, and with which coöperates a spring-pressed pawl 192 carried by the yoke 189. The shaft 190 is formed with a threaded portion 193 (see Figs. 3 and 5) which engages a correspondingly threaded opening in a bracket 194 secured to the lower side of the grinder carriage 28. As will now be seen, at each complete reciprocation of the work carriage, the incidental oscillation of the shipper lever 152 will be communicated, through the link 185, to the yoke 189, causing the pawl 192, by engagement with the ratchet wheel 191, to turn said ratchet wheel a greater or less distance in the direction of the arrow on Fig. 9, thereby turning the feed shaft 190, the threaded portion 193 of which, by engagement with the threaded opening in the bracket 194, causes the grinder carriage 28 to be fed forward a predetermined amount. The amount of this feed movement is determined by the adjustment of the bolt 186 in the slot 187, whereby the pawl 192 can at each operation be caused to engage one, two, three, or more teeth of the ratchet wheel 191.

195 denotes a pin projecting from the pawl 192 through a slot 196 (see Fig. 10) in the yoke 189, said slot having an offset portion 197. By lifting the pawl 192 by means of a pin 195, and passing said pin into the offset portion 197 of the slot, said pawl 192 may be held out of engagement with the ratchet wheel 191, thereby rendering the automatic feeding means inoperative. Preferably the slot 187 in the shipper lever 152 will also be of such length and arrangement that the bolt 186 may be adjusted sufficiently near the pivot 153 of said shipper lever to prevent sufficient movement of the yoke 189 to permit the pawl 192 to move from one tooth of the ratchet wheel 191 to the next, so that if desired the automatic feeding mechanism may be rendered inoperative in this way also.

198 (see Fig. 9) denotes a throw-off or cam block secured to the edge of the ratchet wheel 191 at a suitable point by means of a screw 199. The block 198, when the ratchet wheel 191 has been moved a predetermined amount, engages the pawl 192 and moves the same out of engagement with said ratchet wheel, thereby providing for the automatic stopping of the feed mechanism when the grinder has been carried into a predetermined position.

The manually operated means for positioning or feeding the grinder carriage comprises a hand wheel 200 (see Figs. 1 and 3) secured to the forward end of the feed shaft 190. In order to permit the adjustment, withdrawal, or manual feeding of the grinder carriage with equal facility from the rear of the machine there is provided a hand wheel 201 (see Figs. 2 and 3) secured to a shaft 202 journaled in a bracket 203 secured to the gear casing 89.

204 denotes a bevel gear fast on the shaft 202 and meshing with a bevel gear 205 fast on a transverse shaft 206 journaled in the back extension 21 and carrying at its end a second bevel gear 207 which meshes with a bevel gear 208 on the end of the feed shaft 190. It will be seen that the shaft 190 can be turned with equal facility, either from the front of the machine by the hand wheel 200 directly, or from the back of the machine by the hand wheel 201 through the shafts 202 and 206 and bevel gears 204, 205, 207 and 208.

The operations of the several parts of the machine have been indicated in connection with the foregoing description of their construction and arrangement, but the general operation of the complete machine may be reviewed as follows. The work is secured to the carriage 23, with the face thereof to be operated upon toward the rear, either by clamping said work to the carriage by means of dogs engaging the grooves 24, or, preferably, by means of the magnetic chuck 25 shown in Fig. 2. The dogs 156 are secured to the flange 157 of the carriage 23 in positions determined by the length of travel of the carriage required for the particular piece of work being operated upon. The lever 133 is adjusted and locked in position by engagement of the bolt 137 with one of the openings 136 in the segment 135 in accordance with the desired speed of travel of the work carriage with respect to the speed of rotation of the grinding wheel, setting of said lever operating through the shafts 132 and 129, cams 127 and 128, clutch forks 123 and 124, and clutch hubs 110 and 111 to clutch to the shaft 95 the transmission gear necessary to produce the desired speed. The grinder turret 29 is then adjusted angularly with respect to the grinder carriage 28 to cause the grinding wheel 26 to assume the necessary position for flat or concave grinding, in accordance with the requirements, said turret being then clamped in adjusted position by means of the screws or bolts 32. This adjustment, as above explained, will not disturb the driving or transmission connections between the parts on the turret and those on the frame, since the necessary driving connections are provided by the shaft 47 which is arranged coaxial with the pivot connecting the carriage 28 and turret 29, which shaft is permanently connected by bevel gears with the mechanisms on the turret and frame respectively. One of the hand wheels 200 or 201, in accordance with convenience or requirement, may then, if necessary, be operated to move the grinding wheel into a position to engage the work. The hand wheel 120 may, if desired, be operated to move the carriage 23 into any desired starting position. Rotation of the shaft 33 and of the grinding wheel 26 secured thereto, by means of power applied thereto either through the belt pulley 41 or from the motor 35 through the gears 37 and 38, is communicated therefrom, through the gears 42 and 43, countershaft 44, and gears 45 and 46, to the shaft 47, and thence, through the gears 49 and 50, to the shaft 55. Rotation of the latter shaft is transmitted, through the gears 56, 57, 59 and 60 and shafts 58 and 61, to the pump 62, which draws water from the tank or reservoir 65 and discharges the same through the pipe 63 upon the driving wheel 26, said water being returned through the drip pans or gutters 66 to the mud pan or trap 69, where it is relieved of the sediment and from which it is discharged, through the pipe 73, into the tank 65 for reuse. Rotation of the shaft 55 is also transmitted, through the gears 78 and 77, to the shaft 81, and thence, through the gears 91, 92 and 94, or 96 and 97, in accordance with the position of the clutch hub 100, to the transmission countershaft 95. Rotation of the shaft 95 in one direction or the other, in accordance with the setting of the clutch hub 100, is transmitted through one of the gears 101, 102, 103 or 104, in accordance with the setting of the clutch hubs 110 and 111, and through the corresponding gear 105, 106, 107 or 108, to the back gear shaft 109, and thence through the gears 112, 113, 115 and 116 and rack 118 to the carriage 23, causing travel of said carriage in one direction or the other. As the carriage 23 reaches the limit of its movement in one direction the corresponding dog or stop 156 is brought into engagement with the upper end of the shipper lever 152, moving said lever in one direction or the other slightly beyond the position of dead center shown in Fig. 7, whereupon the arrow head 162, under the influence of the spring 163, completes the throw of the shipper lever 152 into its extreme opposite position. Shifting of said shipper lever operates, through the shipper rod 148, bell crank lever 144, clutch controlling rod 139, and clutch fork 138, to shift the clutch hub 100, thereby disconnecting one of the gears 97 or 94 from the shaft 95 and connecting the other therewith, causing said shaft to be rotated in the opposite direction, and consequently causing the direction of movement of the carriage 23 to be reversed.

If at any time during the travel of the carriage 23 in either direction it becomes necessary to stop the same, in order to avoid accident to the work or otherwise, the operator grasps one of the hand levers 166 or 167, in accordance with this position with respect to the machine, and forces the same downwardly, having first unlocked said lever by operation of the corresponding latch lever 175, which acts through the rod 174 and bell crank lever 173 to withdraw the locking bar or bolt 168. Depression of the hand lever 166, either by direct operation or through the shaft 165 by depression of the lever 167, causes the cam notch 181 in the cam arm 180, by engagement with the cam roller 184, to move the clutch controlling rod 139 into the central position shown in Fig. 11, thereby moving the clutch hub 100 into the neutral position shown in Figs. 3 and 13, disconnecting both of the gears 94 and 97 from the shaft 95, and stopping the rotation of the shafts 95 and 109 and consequently the travel of the work carriage. Depression of the lever 166, through the arm 176 and pin 178, results in the withdrawal of the arrow head 162, so that, should it be desired to start up the travel of the carriage in the opposite direction, the shipper lever 158 may be moved into the position necessary to produce this result upon the release of the arrow head 162 and clutch controlling rod 139 when the lever 166 is returned to its normal or elevated position. At each oscillation of the shipper lever 152 incidental to the reversal of the carriage, motion is transmitted therefrom, through the link 185, to the pawl yoke 189, causing said yoke to be oscillated and the pawl 192 carried thereby, by engagement with the teeth of the ratchet wheel 191, to rotate said ratchet wheel and also the shaft 190, to which said ratchet wheel is secured, a greater or less amount (in accordance with the adjustment of the bolt 186 in the slot 187) in the direction of the arrow on Fig. 9. Rotation of the shaft 190, by engagement of the threaded portion 193 thereof with the bracket 194 on the grinder carriage 28, causes the grinding wheel 26, at each reciprocation of the work carriage, to be fed a slight amount in the direction of the work. As the grinder carriage 28 moves, the bevel gear 50 is carried with it by the bracket or hanger 52, and therefore maintained in proper mesh with the gear 49, said gear 50 moving longitudinally on the shaft 55 but being connected with said shaft for rotation therewith by means of the spline or feather 54.

Having thus described our invention, we claim:

1. In a machine of the character described, in combination, a frame, a pivoted turret, mechanism in said frame, mechanism on said turret, and power transmitting devices connecting said mechanisms and arranged coaxially with the pivot of said turret.

2. In a machine of the character described, in combination, a carriage, mechanism for operating said carriage, a pivoted turret, grinding mechanism on said turret, and transmission devices connecting said carriage operating mechanism and said grinding mechanism arranged coaxially with the pivot of said turret.

3. In a machine of the character described, in combination, a frame, a grinder turret, a hollow bushing on which said turret is pivoted, grinding mechanism on said turret, a shaft journaled in said bushing, bevel gears connecting said grinding mechanism and shaft, a shaft journaled in said frame, and bevel gears connecting said last-named shaft with said first-named shaft.

4. In a machine of the character described, in combination, a frame, work-holding and grinding mechanism on said frame, controlling means for said mechanism operable from either side of said frame, and means operable from either side of said frame for locking said controlling means.

5. In a machine of the character described, in combination, a frame, work holding and grinding mechanism on said frame, a shaft journaled in said frame and extending from front to rear thereof, hand levers secured to said shaft at the front and rear ends thereof respectively, and means operated by said hand levers for controlling said mechanism.

6. In a machine of the character described, in combination, a frame, work holding and grinding mechanism on said frame, a shaft journaled in said frame and extending from front to rear thereof, hand levers secured to said shaft at the front and rear ends thereof respectively, means operated by said hand levers for controlling said mechanism, a spring pressed locking rod or bolt slidably mounted in said frame for locking said hand levers and shaft, and means associated with both of said hand levers for operating said rod or bolt.

7. In a machine of the character described, in combination, a frame, work holding and grinding mechanism on said frame, a shaft journaled in said frame and extending from front to rear thereof, hand levers secured to said shaft at the front and rear ends thereof respectively, a spring pressed locking rod or bolt slidably mounted in said frame for engaging and locking one of said hand levers, segmental flanges on said locking rod or bolt, bell crank levers pivoted to said hand levers and engaging said flanges to withdraw said rod or bolt, latch levers pivoted to said hand levers, and rods connecting said latch levers and bell crank levers.

8. In a machine of the character described, in combination, a frame, a work carriage movably mounted on said frame, automatic means for moving said carriage, means for reversing the direction of movement of said carriage, and manually operated means coöperating with said reversing means and operable from either side of said frame to stop said carriage at any desired point in its movement.

9. In a machine of the character described, in combination, a work carriage, automatic means for moving and controlling said carriage including a clutch controlling rod, a manually operated lever provided with a cam arm, and means on said rod engaged by said cam arm to move said rod into a position to stop said carriage.

10. In a machine of the character described, in combination, a work carriage, means for reciprocating said carriage including a double faced clutch movable into opposite positions for causing movement of said carriage in opposite directions, a rod for controlling said clutch, means for automatically operating said rod, a manually operated lever provided with an arm having a V-shaped cam notch, and a roller on said rod coöperating with said notch for actuating said rod to move said clutch into a neutral position to stop said carriage.

11. In a machine of the character described, in combination, a frame, a work carriage movably mounted on said frame, automatic means for moving and controlling said carriage including a clutch controlling rod, a shaft journaled in said frame and extending from front to rear thereof, hand levers secured to said shaft at the front and rear of said frame, respectively, one of said levers having a cam arm, and means on said rod engaged by said cam arm to move said rod into a position to stop said carriage.

12. In a machine of the character described, in combination, a frame comprising a bed and a back extension, a grinder carriage movably mounted on said back extension, a feed shaft journaled in said bed and provided with means for engaging and operating said carriage, a hand wheel on the forward end of said shaft, a transverse shaft journaled in said back extension, bevel gears connecting said feed shaft and transverse shaft, an upright shaft journaled in said back extension in the rear of said bed, bevel gears connecting said upright shaft and transverse shaft, and a hand wheel carried by said upright shaft.

13. In a machine of the character described, in combination, a frame, a grinder carriage movably mounted on said frame and having a bracket provided with a threaded opening, and a feed shaft journaled in said frame and having a threaded portion coöperating with the threaded opening in said bracket for moving said carriage on said frame.

14. In a machine of the character described, in combination, a frame, a grinder carriage movably mounted on said frame and having a bracket provided with a threaded opening, a feed shaft journaled in said frame and having a threaded portion coöperating with the threaded opening in the said bracket for moving said carriage on said frame, automatic means for rotating said shaft, and manually operated means for rotating said shaft.

15. In a machine of the character described, in combination, a frame, a grinder carriage movably mounted on said frame and having a bracket provided with a threaded opening, a feed shaft journaled in said frame and having a threaded portion coöperating with said threaded opening for moving said carriage on said frame and manually operated devices arranged at opposite sides of said frame respectively for rotating said shaft.

16. In a machine of the character described, in combination, a work carriage, means for operating said carriage, a source of power, a transmission counter-shaft operatively connected with said source of power, a series of gears loose on said countershaft, a back gear shaft operatively connected with said carriage operating means, a series of gears fast on said back gear shaft, the gears on said countershaft and back gear shaft respectively being arranged in coöperating pairs, and means for alternatively clutching the gears on said countershaft thereto.

17. In a machine of the character described, in combination, a work carriage, means for operating said carriage, a source of power, a transmission countershaft operatively connected with said source of power, a series of gears loose on said countershaft, a back gear shaft operatively connected with said carriage operating means, a series of gears fast on said back gear shaft, the gears on said countershaft and back gear shaft respectively being arranged in cooperating pairs, a series of clutch hubs on said countershaft for clutching the gears thereon thereto, clutch forks for operating said hubs, a shaft, and a series of cams on said shaft for successively operating said clutch hubs as said shaft is progressively rotated.

18. In a machine of the character described, in combination, a work carriage, means for operating said carriage, a source of power, transmission mechanism operatively connected with said source of power and with said carriage operating means, said transmission mechanism being adjustable to cause said carriage to be operated at different speeds, a controlling shaft for said transmission mechanism, an operating lever for said shaft, a locking segment provided with a series of openings, and a locking bolt on said lever adapted to engage said openings respectively.

19. In a machine of the character described, in combination, a carriage, means for operating said carriage, a countershaft operatively connected with said carriage operating means, a power shaft, a pair of gears loose on said countershaft, means operated by said power shaft for rotating said gears in opposite directions, a double faced clutch hub movable into opposite positions for alternatively connecting said gears to said countershaft for causing movement of said carriage in opposite directions, means operated by said carriage for controlling said clutch hub, and manually operated means for moving said clutch hub into a neutral position to stop said carriage.

20. In a machine of the character described, in combination, a work carriage, means for operating said carriage, a transmission countershaft, a power shaft, a pair of gears loose on said countershaft, means operated by said power shaft for rotating said gears in opposite directions, a double faced clutch hub for alternatively connecting said gears to said countershaft, means operated by said carriage for controlling said clutch hub, a series of gears loose on said countershaft, a back gear shaft operatively connected with said carriage operating means, a series of gears fast on said back gear shaft, the last-named gears on said countershaft and the gears on said back gear shaft respectively being arranged in coöperating pairs, and means for alternatively clutching the last named gears on said countershaft thereto.

21. In a machine of the character described, in combination, a carriage, means for operating said carriage, a source of power, and means connecting said source of power and carriage operating means including a shaft and a gear frictionally mounted on said shaft.

22. In a machine of the character described, in combination, a work carriage, means for operating said carriage, a countershaft operatively connected with said carriage operating means, a driven shaft, a pair of gears loose on said countershaft, means operated by said driven shaft for rotating said gears in opposite directions, a double faced clutch hub for alternatively connecting said gears to said countershaft, means operated by said carriage for controlling said clutch hub, a gear frictionally mounted on said driven shaft, and means for applying power to said last named gear.

23. In a machine of the character described, in combination, a carriage, means for operating said carriage, a source of power, and means connecting said source of power and carriage operating means including a shaft, a gear having a web and a hub loosely mounted on said shaft, a collar keyed to said shaft and having a friction flange adjacent said web, a friction ring loosely mounted on said collar at the opposite side of said flange from said web, guide bolts connecting said web and friction ring for rotation in unison, and springs on said bolts for forcing said web and friction ring toward one another to grip said friction flange between them.

24. In a machine of the character described, in combination, a grinding wheel, a tank, a pump for drawing water from said tank and discharging the same upon said wheel, a removable settling pan in said tank, and means for delivering water discharged from said wheel into said settling pan.

25. In a machine of the character described, in combination, a grinding wheel, a tank, a pump for drawing water from said tank and discharging the same upon said wheel, a hood inclosing said wheel, one or more drip pans into which the water in said hood is discharged, and a removable settling pan in said tank and into which said drip pans discharge.

26. In a machine of the character described, in combination, a frame, a work carriage, means for moving said carriage, means for reversing the direction of movement of said carriage, a grinder carriage movably mounted on said frame and having a bracket with a threaded opening, grinding means on said grinder carriage, a feed shaft journaled in said frame and having a threaded portion coöperating with the threaded opening in said bracket for moving said grinder carriage toward said work carriage, a ratchet wheel on said shaft, a pawl coöperating with said ratchet wheel, and a pawl carrier operatively connected with said work carriage reversing means.

27. In a machine of the character described, in combination, a carriage, means for moving said carriage, means for reversing the direction of movement of said carriage including a slotted shipper lever engaged and operated by said carriage, grinding means, means for feeding said grinding means toward said carriage, a ratchet wheel for operating said feeding means, a pawl coöperating with said ratchet wheel, a pawl carrier, a link connected at one end to said pawl carrier, and means for adjustably securing the opposite end of said link in the slot in said shipper lever.

28. In a machine of the character described, in combination, a work carriage, means for moving said carriage, means for reversing the direction of movement of said carriage, grinding means, means for feeding said grinding means toward said carriage, and means for operating said feeding means including a ratchet wheel, a pawl coöperating with said ratchet wheel, a pawl carrier operatively connected with said carriage reversing means, said pawl carrier having a slot formed with an offset portion, and a pin on said pawl operating in said slot and adapted to engage said offset portion to hold said pawl out of engagement with said ratchet wheel.

29. In a machine of the character described, in combination, a carriage, means for moving said carriage, means for reversing the direction of movement of said carriage, grinding means, means for feeding said grinding means toward said carriage, means for operating said feeding means including a ratchet wheel, a pawl coöperating with said ratchet wheel, a pawl carrier operatively connected with said carriage reversing means, and a cam block on said ratchet wheel for engaging said pawl and moving the same out of engagement with the teeth of said ratchet wheel when said ratchet wheel has been turned a predetermined amount.

30. In a machine of the character described, in combination, a carriage, means for moving said carriage, a shipper lever for controlling the direction of movement of said carriage, means on said carriage for engaging and initially operating said shipper lever, and a pointed spring pressed arrow head engaging said lever for completing the operation thereof.

31. In a machine of the character described, in combination, a carriage, means for moving said carriage, a shipper lever for controlling the direction of movement of said carriage and having a rigid arm, a roller carried by said arm and having a V-shaped peripheral groove, dogs on said carriage for engaging and initially operating said shipper lever, and a conical spring pressed arrow head engaging the groove in said roller for completing the operation of said shipper lever.

32. In a machine of the character described, in combination, a carriage, means for moving said carriage, a clutch for controlling the direction of movement of said carriage, a rod for controlling said clutch, a shipper lever operatively connected with said rod, means on said carriage for engaging and initially operating said shipper lever, a spring pressed arrow head engaging said lever for completing the operation thereof, and manually operated means for moving said rod to release said clutch and for simultaneously withdrawing said arrow head against the tension of its spring.

33. In a machine of the character described, in combination, a carriage, means for moving said carriage, a clutch for controlling the direction of movement of said carriage, a rod for controlling said clutch, a shipper lever operatively connected with said rod, means on said carriage for engageing and initially operating said shipper lever, a spring pressed plunger having an arrow head engaging said lever for completing the operation thereof, a pin projecting from said plunger, and a hand lever having means for engaging and moving said rod to release said clutch, said lever having an arm provided with a slot in which said pin is received for withdrawing said arrow head against the tension of its spring when said clutch is released.

34. In a machine of the character described, in combination, a work carriage, means for moving said carriage, a clutch for controlling the direction of movement of said carriage, a rod for controlling said clutch, a shipper lever operatively connected with said rod, means on said carriage for engaging and initially operating said shipper lever, a spring pressed plunger having an arrow head engaging said lever for completing the operation thereof, a pin projecting from said plunger, a hand lever provided with a cam arm, and means on said rod engaged by said cam arm to move said rod into position to release said clutch, said hand lever having also an arm provided with a slot in which said pin is received for withdrawing said arrow head against the tension of its spring when said clutch is released.

35. In a machine of the character described, in combination, a frame, mechanism in said frame, a grinder carriage movably mounted on said frame, a source of power on said grinder carriage, and a transmission member movable with said carriage and in continuous operative engagement with the mechanism on said frame.

36. In a machine of the character described, in combination, a frame, mechanism on said frame, a grinder carriage movably mounted on said frame, a grinder turret pivoted to said carriage, a source of power on said turret, transmission devices operatively connected with said source of power and arranged coaxially with the pivot of said turret, and a transmission member coöperating with said transmission devices, said transmission member being movable with said carriage and being in continuous operative engagement with the mechanism in said frame.

37. In a machine of the character described, in combination, a frame, mechanism in said frame, a shaft journaled in said frame and operatively connected with said mechanism, a grinder carriage movably mounted on said frame, a source of power on said grinder carriage, a sleeve splined to said shaft for rotation therewith, a journal for said sleeve on said carriage, said sleeve being movable longitudinally on said shaft with said carriage, a gear carried by said sleeve, and a shaft on said carriage operatively connected with said source of power and having a gear meshing with said first named gear.

38. In a machine of the character described, in combination, a frame, a grinder carriage movably mounted on said frame, a grinder turret, grinding mechanism on said turret, a hollow bushing pivotally connecting said turret and carriage, a source of power on said grinder carriage for actuating said grinding mechanism, a shaft journaled in said bushing, bevel gears connecting said grinding mechanism and shaft, a shaft journaled in said frame, a sleeve splined to said last named shaft for rotation therewith, a journal for said sleeve on said carriage, said sleeve being movable longitudinally on said last named shaft with said carriage, and bevel gears connecting said sleeve and first named shaft.

39. In a machine of the character described, in combination, a frame, a grinder carriage movably mounted on said frame, a grinder turret pivoted to said grinder carriage, mechanism in said frame, a shaft journaled in said turret, a grinding wheel on said shaft, a motor mounted on said turret and operatively connected with said shaft, and transmission devices connecting said shaft with the mechanism in said frame and arranged coaxially with the pivot of said turret.

40. In a machine of the character described, in combination, a frame, mechanism in said frame, a grinder carriage movably mounted on said frame, a grinder turret pivoted to said grinder carriage, a shaft journaled in said turret, a grinding wheel on said shaft, a motor mounted on said turret and operatively connected with said shaft, and a transmission member operatively connected with said shaft, movable with said carriage, and in continuous operative engagement with the mechanism in said frame.

41. In a machine of the character described, in combination, a frame, mechanism in said frame, a grinder carriage movably mounted on said frame, a grinder turret pivoted to said carriage, a shaft journaled in said turret, a grinding wheel on said shaft, a motor mounted on said turret and operatively connected with said shaft, transmission devices operatively connected with said shaft and arranged coaxially with the pivot of said turret, and a transmission member coöperating with said transmission devices, said transmission member being movable with said carriage and being in continuous operative engagement with the mechanism of said frame.

42. In a machine of the character described, in combination, a frame, a grinder carriage movably mounted on said frame, a grinder turret, a hollow bushing pivotally connecting said turret and carriage, a grinder shaft journaled in said turret, a grinding wheel on said shaft, a motor mounted on said turret and operatively connected with said shaft, a countershaft journaled in said turret and geared to said grinder shaft, a transmission shaft journaled in said bushing, bevel gears connecting said countershaft and transmission shaft, a shaft journaled in said frame, a sleeve splined to said last named shaft for rotation therewith, a journal for said sleeve on said carriage, said sleeve being movable longitudinally of said last named shaft with said carriage, and bevel gears connecting said sleeve and transmission shaft.

In testimony whereof we affix our signatures in presence of two witnesses.

ELWIN R. HYDE.
THOMAS D. ADAMS.

Witnesses:
H. W. MEADE,
E. M. CULVER.